United States Patent
Fujimoto

(10) Patent No.: US 6,690,910 B2
(45) Date of Patent: Feb. 10, 2004

(54) CLOSE-ASSIST DEVICE AND AUTO ORIGINAL FEEDER AND IMAGE FORMING APPARATUS EQUIPPED WITH THE DEVICE

(75) Inventor: Hitoshi Fujimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/224,601

(22) Filed: Aug. 21, 2002

(65) Prior Publication Data

US 2003/0053832 A1 Mar. 20, 2003

(30) Foreign Application Priority Data

Aug. 24, 2001 (JP) ........................... 2001-255375

(51) Int. Cl.[7] ............................................... G03G 15/00
(52) U.S. Cl. ............................................ 399/367; 355/75
(58) Field of Search ................................. 399/367, 411, 399/380; 16/412, 436, 438, 443, 110.1; 355/75

(56) References Cited

U.S. PATENT DOCUMENTS

| | | | | |
|---|---|---|---|---|
| 1,464,694 A | * | 8/1923 | Campbell | 49/277 |
| 3,857,623 A | * | 12/1974 | Schneller | 312/266 |
| 4,890,552 A | * | 1/1990 | Yelczyn | 100/233 |
| 5,065,877 A | * | 11/1991 | Karppinen et al. | 215/239 |
| 5,229,816 A | | 7/1993 | Fujimoto et al. | 399/52 |
| 5,308,158 A | * | 5/1994 | Vogelgesang et al. | 312/319.3 |
| 5,870,647 A | * | 2/1999 | Nada et al. | 399/18 |
| 5,924,757 A | * | 7/1999 | Stapf | 16/82 |
| 5,971,514 A | * | 10/1999 | Hayakawa | 16/291 |
| 2002/0168197 A1 | * | 11/2002 | Kitozaki | 399/88 |
| 2002/0184736 A1 | * | 12/2002 | Nelson | 16/412 |

FOREIGN PATENT DOCUMENTS

| | | | | |
|---|---|---|---|---|
| JP | 61118739 A | * | 6/1986 | G03B/27/62 |
| JP | 6-156751 | | 6/1994 | |
| JP | 08334941 A | * | 12/1996 | G03G/15/00 |

* cited by examiner

*Primary Examiner*—Arthur T. Grimley
*Assistant Examiner*—Ryan Gleitz
(74) *Attorney, Agent, or Firm*—Fitzpatrick, Cella, Harper & Scinto

(57) ABSTRACT

A close-assist device for assisting the closing of an openable and closeable member provided on an apparatus main body so as to be vertically openable and closeable at the time when the openable and closeable member is opened by an angle not less than a predetermined angle but less than 90 degrees with respect to the apparatus main body and maintained in the open state, the close-assist device including: a close-assist member provided on the openable and closeable member so as to be capable of dangling and rotating at the time when the openable and closeable member is opened; and a rotation restricting unit which, when the openable and closeable member is in the open state, restricts the rotation of the close-assist member in a direction in which it moves away from an opening/closing base portion of the openable and closeable member.

15 Claims, 8 Drawing Sheets

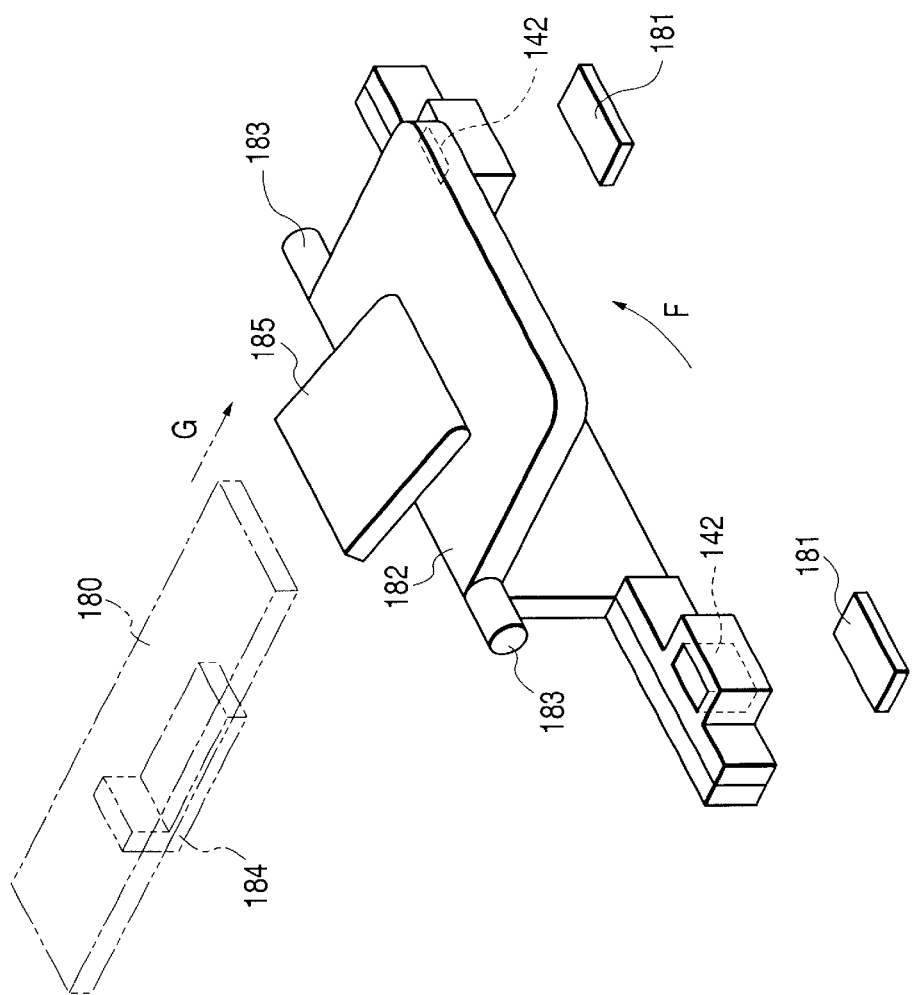

CLOSE-ASSIST DEVICE AND AUTO ORIGINAL FEEDER AND IMAGE FORMING APPARATUS EQUIPPED WITH THE DEVICE

BACKGROUND OF THE INVENTION

1. Field of the Invention

The present invention relates to a close-assist device used as an auxiliary device when closing an openable and closeable member provided in an apparatus main body so as to be openable and closeable, an auto original feeder equipped with this close-assist device and adapted to supply an original to an image reading device, and an image forming apparatus equipped with this auto original feeder as a component and adapted to form an image on a sheet.

2. Related Background Art

Up to now, there has been available an opening/closing device which has an openable and closeable member provided in a device main body so as to be vertically openable and closeable; when the openable and closeable member is opened through an angle not less than a predetermined angle but less than 90 degrees with respect to the device main body, the openable and closeable member is maintained in the open state.

This opening/closing device is formed when, for example, an auto original feeder is provided in an image reading device so as to be openable and closeable. The auto original feeder supplies an original in the form of a sheet automatically to the image reading device. The image reading device reads originals supplied one by one from the auto original feeder. In this case, the image reading device corresponds to the device main body, and the auto original feeder corresponds to the openable and closeable member. There also is an image reading device of the type which has an openable and closeable lid instead of an auto original feeder and which reads an original placed with the lid open. In this case, the lid corresponds to the openable and closeable member.

Further, in some cases, an image reading device equipped with an auto original feeder is incorporated into the apparatus main body of an image forming apparatus as a part of a component of the image forming apparatus. The image forming apparatus forms an original image on a sheet in an image forming portion on the basis of original image information read by the image reading device.

In the image reading device, an image reading portion is the portion where the user places an original. Thus, it is necessary to open the lid provided in the image reading portion so as to be openable and closeable or the auto original feeding portion before placing the original. In order that the original may be easily placed in the image reading portion, a construction is adopted in which when the lid or the auto original feeding portion is opened by an angle not less than a predetermined angle, the lid or the auto original feeding portion is maintained in a state in which it remains open by the predetermined angle.

In the conventional lid constituting the openable and closeable member or the auto original feeding portion, when the user opens the lid or the auto original feeding portion by the predetermined angle and removes the original whose image has been read from the image reading portion, the lid or the auto original feeding portion is maintained in the state in which it is open by the predetermined angle unless the user closes it.

Thus, when the user goes away without closing the lid or the auto original feeding portion, it can happen that the next user of the image reading device is on a wheelchair; in such a case, the lid or the auto original feeding portion cannot be reached, and it is impossible for the user to use the image reading device with the lid or the auto original feeding portion closed.

SUMMARY OF THE INVENTION

It is an object of the present invention to provide a close-assist device which enables a person who is on a chair and cannot reach an openable and closeable member left open to close the openable and closeable member, and an auto original feeder and an image forming apparatus equipped with this close-assist device.

In order to achieve the above object, according the present invention, there is provided a close-assist device for assisting the closing of an openable and closeable member provided on an apparatus main body so as to be vertically openable and closeable at the time when the openable and closeable member is opened by an angle not less than a predetermined angle but less than 90 degrees with respect to the apparatus main body and maintained in the open state, the close-assist device including:

a close-assist member provided on the openable and closeable member so as to be capable of dangling and rotating at the time when the openable and closeable member is opened; and rotation restricting means which, when the openable and closeable member is in the open state, restricts the rotation of the close-assist member in a direction in which it moves away from an opening/closing base portion of the openable and closeable member.

In the close-assist device according to the present invention, when the openable and closeable member having been opened is being closed, the rotation restricting means restricts the rotation of the close-assist member such that when the lower end portion of the close-assist member comes into contact with the apparatus main body the angle made by the close-assist member on the opening/closing end side of the openable and closeable member and the surface of the apparatus main body coming into contact with the lower end portion of the close-assist member is an acute angle.

In the close-assist device according to the present invention, the rotation restricting means is provided between opposing portions of the openable and closeable member and the close-assist member when the close-assist member is in the dangling state.

In the close-assist device according to the present invention, the close-assist member is provided aside of the openable and closeable member.

In the close-assist device according to the present invention, the close-assist member has a protruding member which protrudes toward the openable and closeable member and which abuts against the apparatus main body when the openable and closeable member is closed.

In the close-assist device according to the present invention, there is provided urging means for urging the close-assist member toward the apparatus main body.

In order to achieve the above object, according to the present invention, there is provided an auto original feeder which is provided in an image reading device for reading an image of an original so as to be openable and closeable and which automatically supplies an original to the image reading device, in which the auto original feeder is provided with one of the close-assist devices described above, and in which the image reading device constitutes an apparatus main body, the auto original feeder constituting an openable and closeable member.

In order to achieve the above object, according to the present invention, there is provided an image forming apparatus including:

image reading means for reading an image of an original;

original feeding means which is provided on the image reading means so as to be openable and closeable and which supplies an original to the image reading means;

image forming means for forming on a sheet an image of the original read by the image reading means; and one of the close-assist devices described above, in which the image reading means constitutes an apparatus main body, the original feeding means constituting an openable and closeable member, the close-assist member being provided in the original feeding means.

The close-assist device of the present invention is equipped with a close-assist member which dangles when the openable and closeable member is opened, so that even a user who cannot reach the openable and closeable member left open, for example, a person on a wheelchair, can grasp the close-assist member and close the openable and closeable member easily and reliably.

BRIEF DESCRIPTION OF THE DRAWINGS

FIG. 8 is a schematic perspective view of an open-assist lever according to another embodiment and a rotating lever for opening an auto original feeding portion.

DESCRIPTION OF THE PREFERRED EMBODIMENTS

In the following, a close-assist device according to an embodiment of the present invention and a copying machine constituting an example of an image forming apparatus whose main body is equipped with the close-assist device as a part of a component will be described with reference to the drawings.

Apart from a copying machine, examples of an image forming apparatus include a printer, a facsimile apparatus, and a combination thereof. Thus, the image forming apparatus into which the close-assist device according to the embodiment of the present invention is incorporated as a part of a component is not restricted to a copying machine.

Note that the values in the following description are only given by way of reference, and should not be construed restrictively.

Figure 1:
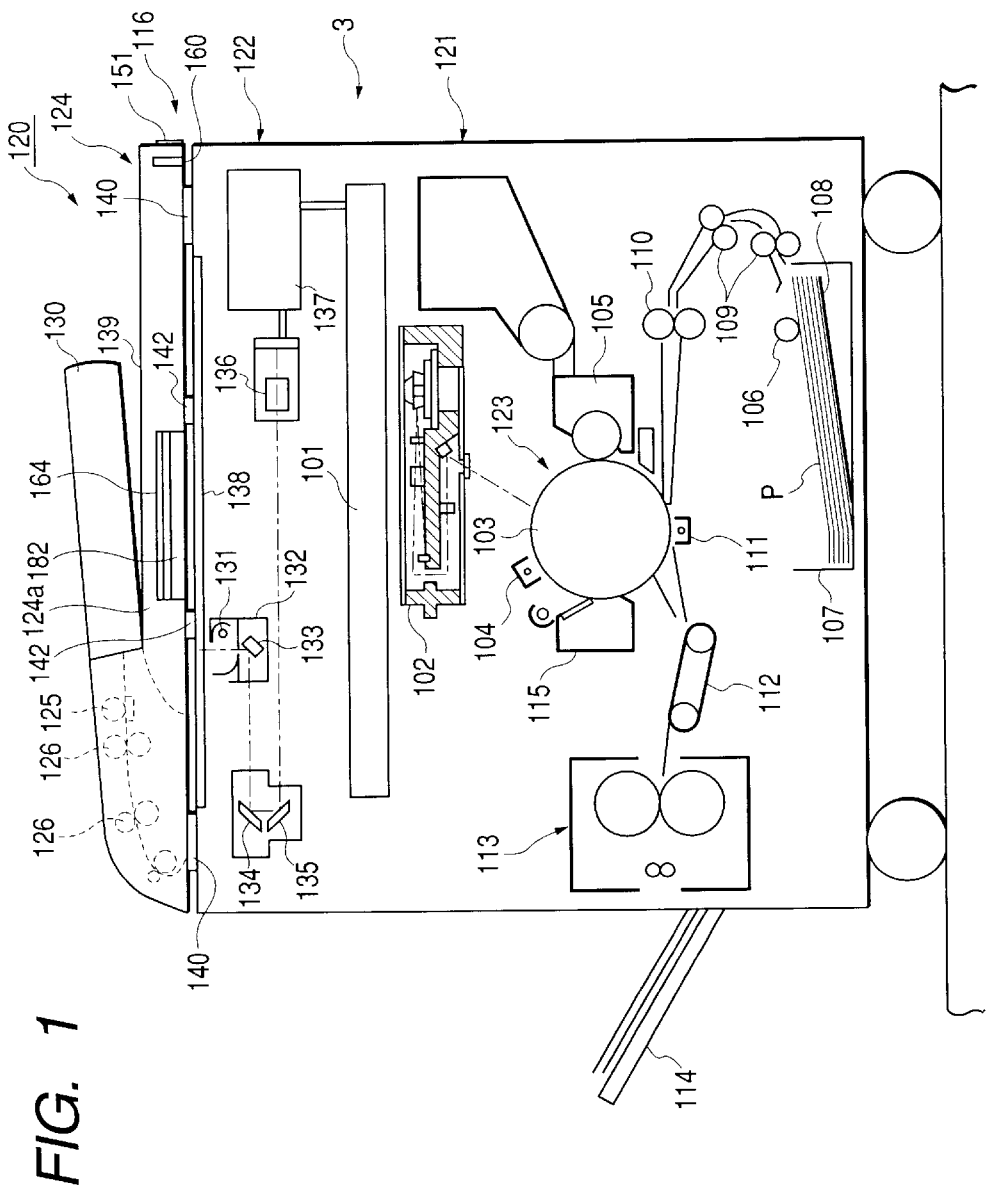
FIG. 1 is a front view schematically showing an auto original feeding portion serving as an auto original feeder equipped with a close-assist device according to an embodiment of the present invention as a component, and a copying machine serving as an image forming apparatus.

In FIG. 1, a copying machine 120 has an image reading portion (device main body, image reading device, and image reading means) 122 in the upper portion of an apparatus main body 121, an image forming portion (image forming means) 123 below the image reading portion (image reading means) 122, and an auto original feeding portion (openable and closeable member, auto original feeder, and original feeding means) 124 above the image reading portion 122, the auto original feeding portion being openable and closeable with respect to the image reading portion 122. The image reading portion 122 and the auto original feeding portion 124 constitute an original reading unit 116.

The auto original feeding portion 124 separates originals stacked on an original tray 130 one from the other by a separating and feeding roller 125, and successively supplies them onto a platen glass 138 of the image reading portion 122 by a transport roller 126, before delivering them onto a delivery tray 139.

Further, the auto original feeding portion 124 is provided so as to be openable and closeable with respect to the apparatus main body 121; by being opened with respect to the apparatus main body 121, an original can be placed on the platen glass 138.

When an original is transported to a predetermined position on the platen glass 138 by the auto original feeding portion 124, a lamp 131 of the image reading portion 122 is lit, and a scanner unit 132 moves to illuminate the original with the lamp 131. The reflected light from the original is input to a CCD image sensor portion 137 by way of mirrors 133, 134, and 135, and a lens 136. The light reflected back from the original and irradiated to the CCD image sensor portion 137 undergoes electrical processing such as photoelectric transfer in the CCD image sensor portion 137 to be subjected to ordinary digital processing.

Thereafter, the image signals thus obtained are used to form an electrostatic latent image on a photosensitive drum 103 by a laser beam scanner 102 through a controller 101. Prior to the formation of the electrostatic latent image, the surface of the photosensitive drum 103 is uniformly charged by a primary charger 104. The electrostatic latent image on the photosensitive drum 103 is developed by a developing device 105 using toner serving as the developer.

A sheet feed roller 106 sends out a sheet P stacked on an inner plate 108 in a sheet feed cassette 107 from the sheet feed cassette 107. A transport roller pair 109 sends a sheet to a registration roller pair 110. The registration roller pair 110 receives the sheet while being at rest and forms a warp in the sheet to correct skew-feed of the sheet.

The registration roller pair 110 matches the leading edge of the sheet that has undergone skew-feed correction with the toner image on the photosensitive drum 103, and sends the sheet to the photosensitive drum 103. A transfer device 111 transfers the toner image to the sheet. Thereafter, a transport belt 112 sends the sheet to a fixing device 113. The fixing device 113 heats and pressurizes the sheet to thereby fix the toner image to the sheet before delivering it to a delivery tray 114. The toner remaining on the photosensitive drum 103 is removed by a cleaner 115.

The auto original feeding portion 124 is designed such that it is maintained in the open state when it has been opened by an angle not less than a predetermined angle but less than 90 degrees (which is, more specifically, approximately 15 degrees) with respect to the apparatus main body 121 by a pair of hinge type connection mechanisms 140. That is, in order that the original may be easily placed on the platen glass 138, the auto original feeding portion 124 is designed such that when it has been opened by an angle not less than the predetermined angle, it is maintained in the state in which it is open by the predetermined angle. A description of the construction of the connection mechanisms 140, which is well known, will be omitted.

The auto original feeding portion 124 has aside of itself a close-assist lever (close-assist member) 151 which is rotatable around a shaft 152. The close-assist lever 151 serves the following purpose: When the user goes away without closing the auto original feeding portion 124 and if the next user of the copying machine 120 is a person on a wheelchair, the auto original feeding portion 124 cannot be reached, and it is impossible for the user to use the copying machine 120 with the auto original feeding portion 124 closed. In such a case, the person on the wheelchair grasps the close-assist lever and pulls it toward him, whereby the auto original feeding portion 124 can be closed.

Figure 3:
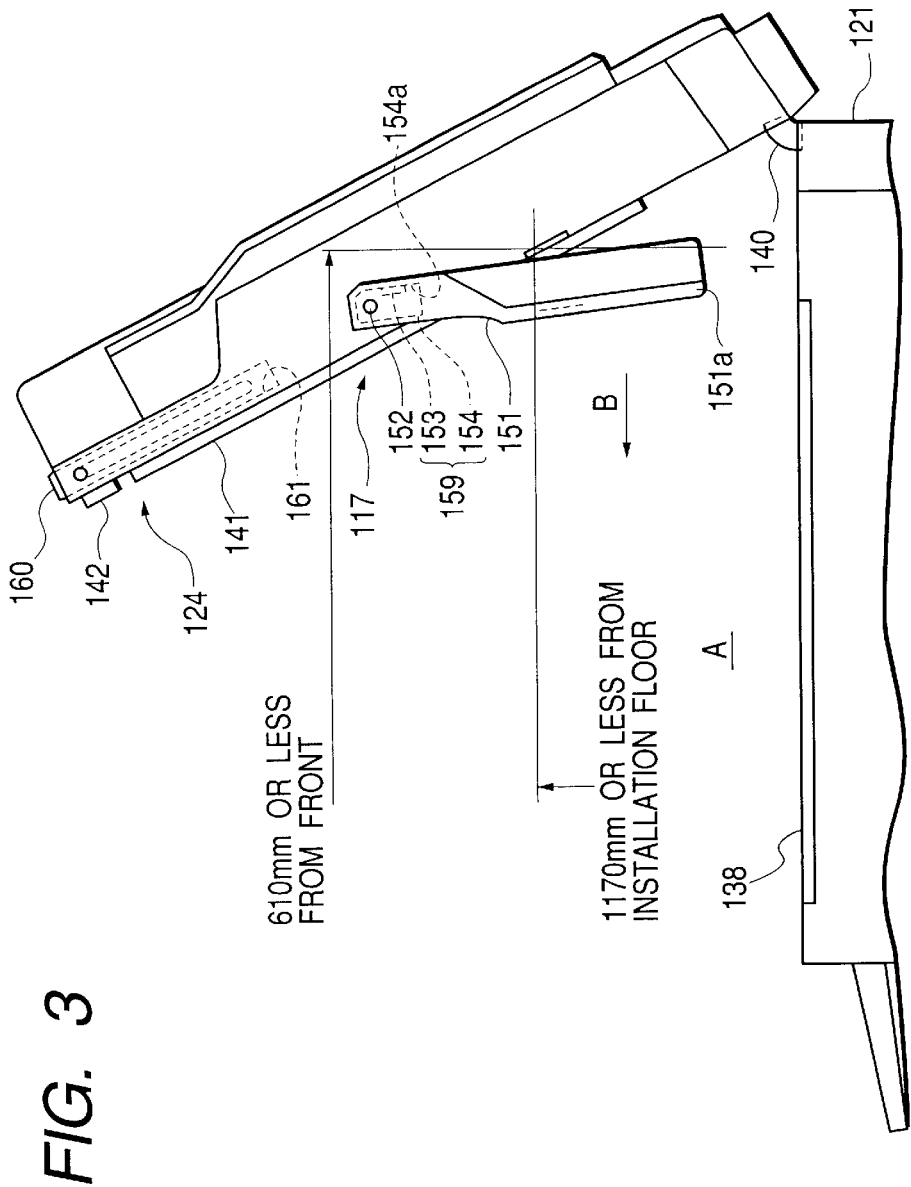
FIG. 3 is a diagram showing a state in which the auto original feeding portion has been opened from the state of FIG. 2 with respect to the apparatus main body.

For this purpose, the close-assist lever 151 is designed such that it dangles with the aid of gravity when the auto original feeding portion 124 is opened; however, since a protrusion 153 provided aside of the auto original feeding portion 124 abuts against an upper inner wall 154a of a recess 154 formed in the close-assist lever 151, its rotation to the left (direction B) in FIG. 3 is restricted. It is also possible to provide the protrusion 153 on the close-assist lever 151 and form the recess 154 aside of the auto original feeding portion 124.

Figure 2:
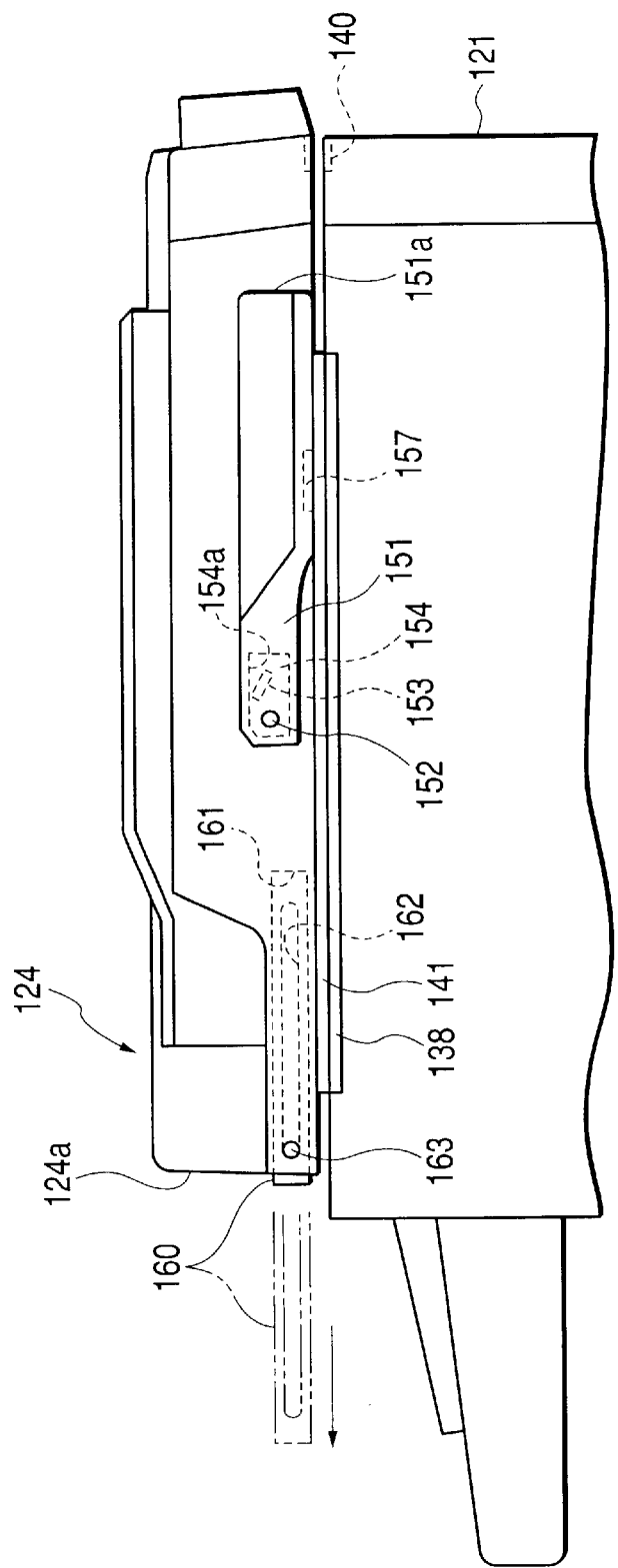
FIG. 2 is a right-hand side view of the copying machine of FIG. 1 with its middle and lower portions omitted.

Further, in order that a lower end portion 151a of the close-assist lever 151 may be positioned between the shaft 152 and the connection mechanism 140 when the auto original feeding portion 124 is closed as shown in FIG. 2, the close-assist lever 151 is restricted in rotation by a rotation restricting portion (rotation restricting means) 159 consisted of the protrusion 153 and the recess 154 when the auto original feeding portion 124 is opened as shown in FIG. 3.

The rotation restricting portion 159 restricts the rotation of the close-assist lever 151 in a direction in which the close-assist lever 151 moves away from the connection mechanism 140 constituting the opening/closing base portion of the auto original feeding portion 124 in the state in which the auto original feeding portion 124 is open.

Figure 4:
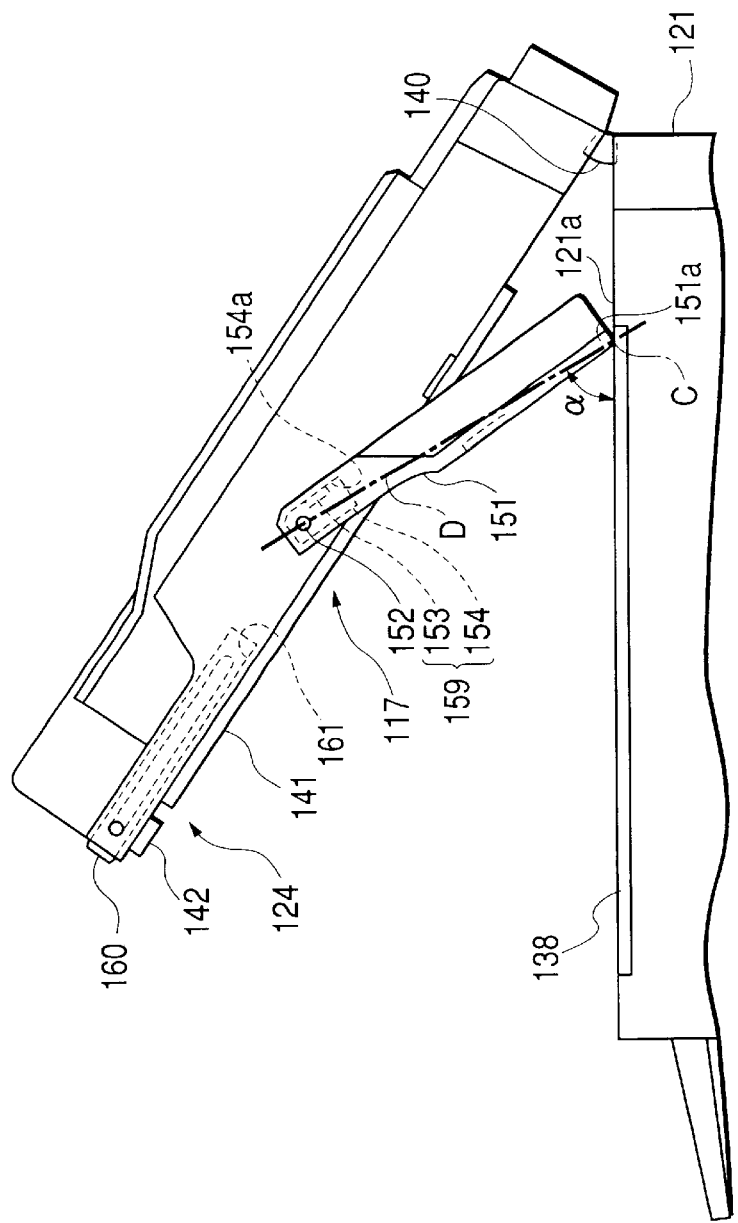
FIG. 4 is a diagram showing a state in which the auto original feeding portion is being closed from the state of FIG. 3 with respect to the apparatus main body.

Further, as shown in FIG. 4, when the auto original feeding portion 124 having been opened is being closed, the rotation restricting portion 159 restricts the rotation of the close-assist lever 151 such that when the lower end portion 151a of the close-assist lever 151 comes into contact with the apparatus main body 121, the angle α, on the opening/ closing end side of the auto original feeding portion 124, formed by the close-assist lever 151 with a lever abutting surface 121a of the apparatus main body 121 with which the lower end portion 151a of the close-assist lever 151 comes into contact is an acute angle.

That is, the rotation restricting portion 159 restricts the rotation of the close-assist lever 151 such that when the lower end portion 151a of the close-assist lever 151 comes into contact with the apparatus main body 121, the angle α formed by a line D connecting a contact point C of the close-assist lever 151 to the lever abutting surface 121a of the apparatus main body 121 and the shaft 152, with the lever abutting surface 121a of the apparatus main body 121 is an acute angle.

While in FIG. 4 the lever abutting surface 121a of the apparatus main body 121 is horizontal, even when it is inclined downward to the right or to the left in FIG. 4, as long as the angle α is an acute angle, the lower end portion 151a of the close-assist lever 151 moves to the right, making it possible to close the auto original feeding portion 124.

If the angle α is an obtuse angle, when the auto original feeding portion 124 is closed, there is the danger of the close-assist lever 151 rotating such that the lower end portion 151a of the close-assist lever 151 moves to the left, bringing the protrusion 153 forcibly into contact with the inner wall 154a of the recess 154, thereby damaging the protrusion 153 and the inner wall 154a of the recess 154.

Specifically, the lower end portion 151a of the close-assist lever 151 is positioned in a region A which is 1170 mm or less from the installation floor of the copying machine 120 and 610 mm or less from the front side of the copying machine 120 when the auto original feeding portion 124 is opened. In this region A, the hand of a person on a wheelchair can easily reach the close-assist lever 151; it is not always necessary for the close-assist lever 151 to be positioned in this region A.

In the above construction, the close-assist lever 151, the protrusion 153, the recess 154, etc. constitute a close-assist device 117. Since the protrusion 153 and the recess 154 are provided on the opposing surfaces of the auto original feeding portion 124 and the close-assist lever 151, they are invisible from the outside, and do not impair the outward appearance of the copying machine.

Further, for the close-assist lever 151 to be reliably brought into the dangling state, it is also possible to provide between the auto original feeding portion 124 and the close-assist lever 151 a spring that urges the close-assist lever 151 so as to move away from the auto original feeding portion 124.

Figure 5:
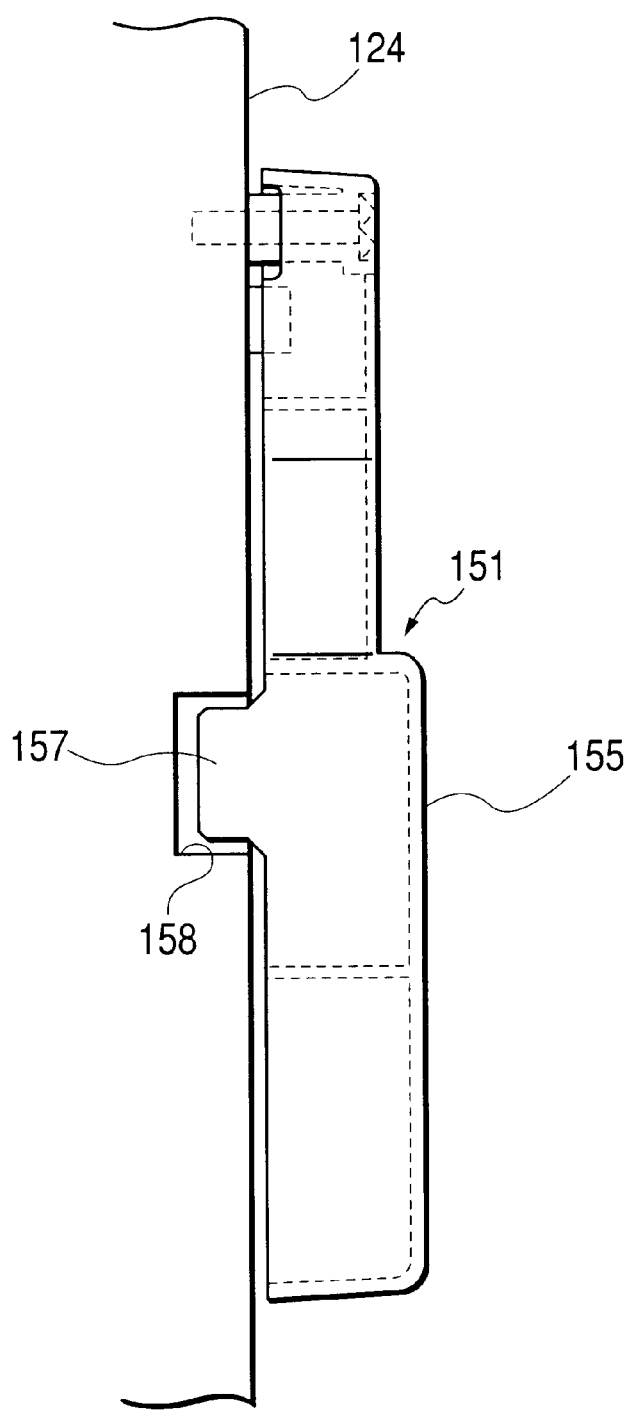
FIG. 5 is a bottom view of FIG. 2, showing the portion corresponding to a close-assist lever.

As shown in FIG. 1, the close-assist lever 151 protrudes from the side of the auto original feeding portion 124 and extends along the same, so that it is more advantageous from the viewpoint of appearance for the close-assist lever 151 to be in alignment with the lower surface of the auto original feeding portion 124 when the auto original feeding portion 124 is closed. For this purpose, the close-assist lever 151 has a protrusion piece 157 as shown in FIG. 5. The protrusion piece 157 protrudes toward the auto original feeding portion 124, and abuts against the apparatus main body 121 when the auto original feeding portion 124 is closed. The auto original feeding portion 124 has a recess 158 for receiving the protrusion piece 157.

In the case in which the apparatus main body 121 protrudes sidewise beyond the auto original feeding portion 124, the lower end portion 151a of the close-assist lever 151 abuts against the protruding portion, and the state as shown in FIG. 2 can be attained. Thus, in this case, the protrusion piece 157 is not absolutely necessary.

Figure 6A:
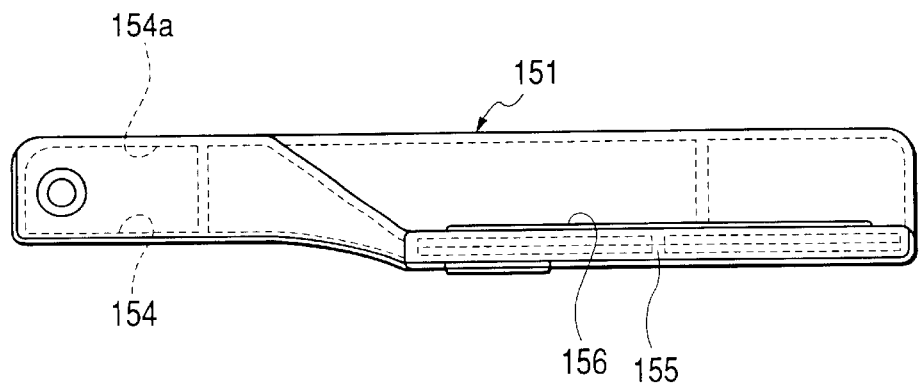
FIG. 6A is a longitudinal side view of the close-assist lever.
Figure 6B:
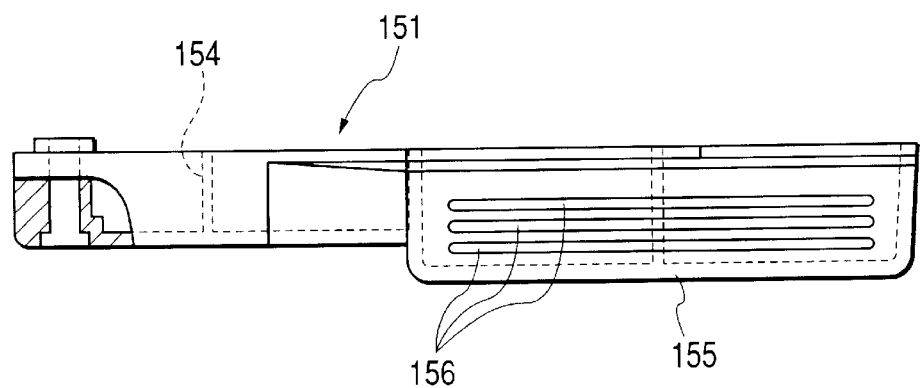
FIG. 6B is a plan view of FIG. 6A.
Figure 6C:
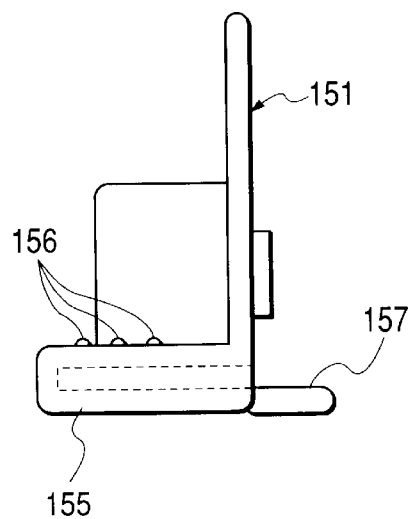
FIG. 6C is a right-hand side view of FIG. 6A.

As shown in FIGS. 6A, 6B, and 6C, a handle member 155 protrudes from the close-assist lever 151 in order to enable a person on a wheelchair to grasp it. On the upper surface of the handle member 155, there are formed a plurality of nonskid ribs 156 extending in the longitudinal direction of the close-assist lever 151.

Thus, a person on a wheelchair is reliably enabled to grasp the close-assist lever 151 and pull it in the direction indicated by the arrow B in FIG. 3.

When opening the auto original feeding portion 124 with respect to the image reading portion 122, the user has to raise the auto original feeding portion 124. Generally speaking, the raising force is prescribed to be approximately 2.26 Kg or less. However, in the case of, for example, a person on a wheelchair who is difficult to apply the force, it may be impossible to raise the auto original feeding portion 124 even with the prescribed force of approximately 2.26 Kg or less.

In view of this, the auto original feeding portion 124 is provided with an open-assist lever 160 which makes it possible to raise the auto original feeding portion 124 with a small force through leverage, using the connection mechanism 140 as a fulcrum. This open-assist lever 160 is provided in an elongated hole 161 formed sidewise along the auto original feeding portion 124 so as to be capable of being pulled toward the front side of the auto original feeding portion 124.

As shown in FIG. 2, a slit 162 of the open-assist lever 160 is engaged with a protruding shaft 163 of the auto original feeding portion 124 so that the open-assist lever 160 may not come out of the elongated hole 161 when it is drawn toward the front side of the auto original feeding portion 124.

Thus, when opening the auto original feeding portion 124, the open-assist lever 160 is drawn out of the auto original feeding portion 124 and raised, whereby it is possible to open the auto original feeding portion 124 with a small force. When opened, the auto original feeding portion 124 is inclined. Thus, when the open-assist lever 160 is released, the open-assist lever 160 slides into the auto original feeding portion 124 with the aid of gravity, and does not protrude beyond the auto original feeding portion 124.

As indicated by reference numeral 164 in FIG. 1, it is also possible for the open-assist lever to be provided at the front center of the auto original feeding portion 124.

Figure 7:
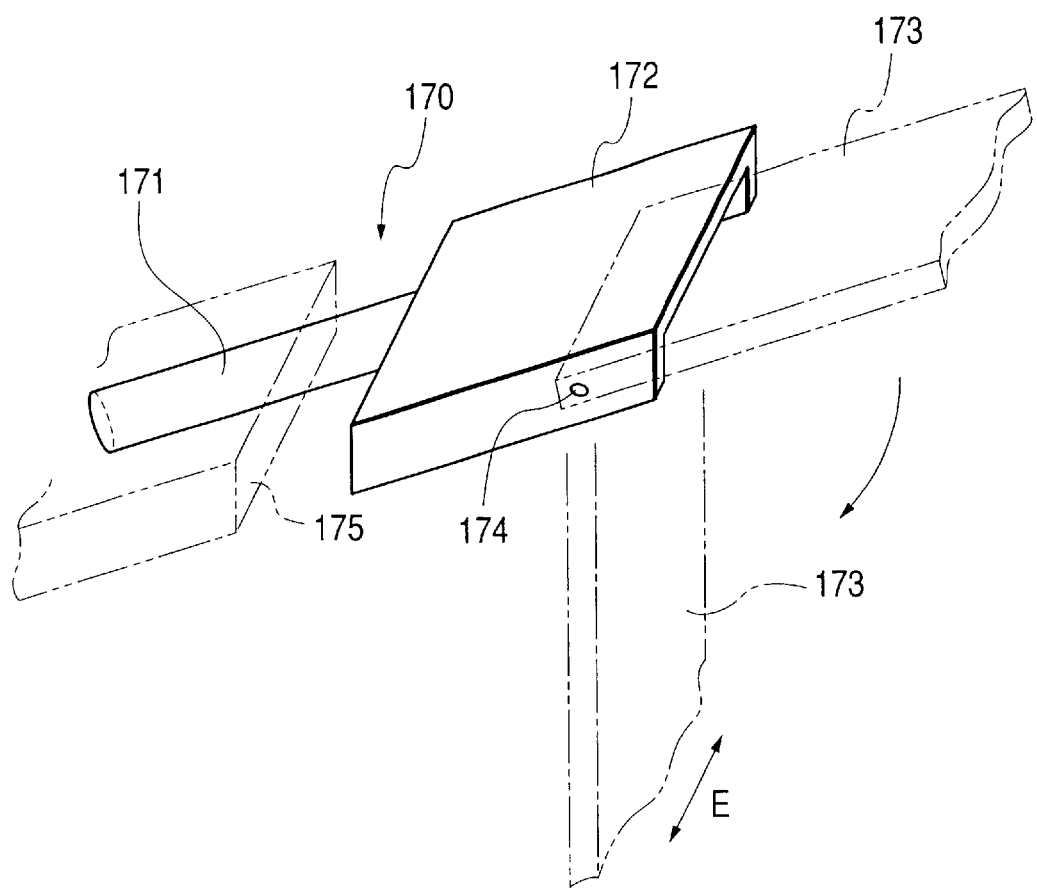
FIG. 7 is a schematic perspective view of an open-assist lever.

Further, while the open-assist lever is returned to the interior of the auto original feeding portion 124 with the aid of gravity when the auto original feeding portion 124 is opened, it is also possible for the lever to remain in the protruding state. In this case, it is desirable to adopt an open-assist lever 170 as shown in FIG. 7.

This open-assist lever 170 is equipped with a round shaft 171 provided in the auto original feeding portion 124 so as to be movable, a bracket 172 provided at the forward end of the round shaft 171, and a raising member 173 provided on the bracket 172 so as to be rotatable by shafts 174. The open-assist lever 170 is pulled out of the auto original feeding portion 124, and when the auto original feeding portion 124 is raised, the bracket 172 and the raising member 173 abut against each other to be integrated.

When, after raising the auto original feeding portion 124, the raising member 173 is released, the raising member 173 dangles downward with the aid of gravity around the shafts 174, and the amount by which it protrudes from the auto original feeding portion 124 is reduced, so that it is not in the way. Further, even when the user interferes with the dangling raising member 173 in the direction indicated by the arrow E, the open-assist lever 160 rotates around the round shaft 171 and can escape.

When restoring the open-assist lever 170 to the interior of the auto original feeding portion 124, the raising member 173 is raised and brought into alignment with the bracket 172, and then the open-assist lever is forced into an accommodating portion 175 of the auto original feeding portion 124.

The auto original feeding portion 124 has in its lower portion a belt 141 for automatically supplying an original to the platen glass 138. On the lower surface of the auto original feeding portion 124 at a position near the front surface 124a thereof, there are provided magnets 142. When the auto original feeding portion 124 is closed, the magnets 142 are attracted by iron members provided on the apparatus main body 121, and hold the auto original feeding portion 124 in close contact with the apparatus main body 121, preventing the belt 141 from being floated over the platen glass 138.

Thus, when opening the auto original feeding portion 124, it is necessary to raise the auto original feeding portion 124 against the attractive force of the magnets 142. In this regard, by pulling the open-assist lever 160, 164, 170 out of the auto original feeding portion 124 and using it, it is possible to open the auto original feeding portion 124 with a small force against the attractive force of the magnets.

Further, it is also possible to adopt a construction as shown in FIG. 8 in which when an open-assist lever 180 is pulled out of the auto original feeding portion 124, the magnets 142 are separated from iron members 181. That is, the magnets 142 are provided on a rotating lever 182 (See also FIG. 1) rotatably provided on the front surface of the auto original feeding portion 124 by support shafts 183. When, in opening the auto original feeding portion 124, the user grasps the rotating lever 182 together with the front portion of the auto original feeding portion 124, it rotates in the direction indicated by the arrow F, and causes the magnets 142 to integrally rotate in the direction indicated by the arrow F, thereby separating the magnets 142 from the iron members 181. In FIG. 8, the iron members 181 are actually at positions where they are in contact with the magnets 142.

Thus, when the open-assist lever 180 is drawn out in the direction indicated by the arrow G, an engagement member 184 protruding from the lower surface of the open-assist lever 180 is engaged with an engagement member 185 protruding from the rotating lever 182 in an inclined state, and the rotating lever 182 rotates in the direction indicated by the arrow F due to the inclined surface of the engagement member 185. As a result, the magnets 142 are separated from the iron members 181. When the auto original feeding portion 124 is opened, the open-assist lever 180 slides into the inclined auto original feeding portion 124 with the aid of gravity and is accommodated therein.

In this way, by adopting a construction in which the magnets 142 are separated from the iron members 181 by utilizing the operation of drawing out the open-assist lever 180, it is possible to achieve an improvement in terms of operability when opening/closing the auto original feeding portion 124.

It is also possible to provide the round shaft 171 of the open-assist lever 170 shown in FIG. 7 with a member corresponding to the above-mentioned engagement member 185, by which the magnets 142 are separated from the iron members 181. In this case, the open-assist lever 170 is drawn out in a condition in which the bracket 172 and the raising member 173 are accommodated in the accommodating portion 175, so that if the member corresponding to the engagement member 185 is provided on the round shaft 171, the member corresponding to the engagement member 185 can be reliably engaged with the engagement member 185.

In the above embodiment, it is also possible to provide a lid (openable and closeable member) instead of the auto original feeding portion 124, and provide the close-assist lever 151, the open-assist lever 160, 164, 170, 180, etc. on the lid.

Further, it is also possible for the open-assist lever to be provided outside the auto original feeder 124.

What is claimed is:

1. A close-assist device for assisting in closing of an openable and closeable member provided on an apparatus main body so as to be vertically openable and closeable when said openable and closeable member is rotated through an angle not less than a predetermined angle but less than 90 degrees with respect to the apparatus main body and maintained in an open state, said close-assist device comprising:

a close-assist member provided on said openable and closeable member; and rotation restricting means which, when said openable and closeable member is in the open state, restricts a rotation of said close-assist member in a direction away from a base portion of said openable and closeable members, wherein a lower end portion of said close-assist member is positioned between a rotation shaft of said close-assist member and the base portion of said openable and closeable member so that when said openable and closeable member is being opened, the lower end portion of said close-assist member is rotatable to dangle in the direction away from the base portion of said openable and closeable member.

2. A close-assist device according to claim 1, wherein, when said openable and closeable member is being closed, said rotation restricting means restricts the rotation of said close-assist member so that when the lower end portion of said close-assist member comes into contact with said apparatus main body, an angle α is an acute angle, wherein the angle α is formed between a surface of said apparatus main body and a line extending through an upper end portion of said close-assist member and a point disposed where said close-assist member contacts said apparatus main body.

3. A close-assist device according to claim 1 or 2, wherein said rotation restricting means is provided between opposing portions of said openable and closeable member and said close-assist member when said close-assist member is in a dangling state.

4. A close-assist device according to claim 1 or 2, wherein said close-assist member is provided on a side of said openable and closeable member.

5. A close-assist device according to claim 1 or 2, wherein said close-assist member has a protrusion piece which protrudes toward said openable and closeable member and which abuts against the apparatus main body when said openable and closeable member is closed.

6. A close-assist device according to claim 1 or 2, further comprising urging means for urging said close-assist member toward the apparatus main body.

7. A close-assist device according to claim 1 or 2, wherein a handle member, which adapted to be grasped by an operator protrudes from said close-assist member.

8. An auto original feeder comprising:

image reading means for reading an image of an original;

original feeding means which is provided on said image reading means so as to be openable and closeable and which feeds an original to said image reading means; and a close-assist device for assisting in the closing of said original feeding means when said original feeding means is rotated through an angle not less than a predetermined angle but less than 90 degrees with respect to said image reading means, said close-assist device comprising:

a close-assist member provided on said original feeding means; and rotation restricting means which, when said original feeding means is open, restricts a rotation of said close-assist member in a direction away from a base portion of said original feeding means, wherein a lower end portion of said close-assist member is positioned between a rotation shaft of said close-assist member and the base portion of said original feeding means so that when said original feeding means is being opened, the lower end portion of said close-assist member is rotatable to dangle in a direction away from the base portion of said original feeding means.

9. An auto original feeder according to claim 8, wherein, when said original feeding means is being closed, said rotation restricting means restricts the rotation of said close-assist member so that when the lower end portion of said close-assist member comes into contact with said image reading means, an angle α is an acute angle, wherein the angle α is formed between a surface of said image reading means and a line extending through an upper end portion of said close-assist member and a point disposed where said close-assist member contacts said image reading means.

10. An auto original feeder according to claim 8 or 9, wherein said rotation restricting means is provided between opposing portions of said original feeding means and said close-assist member when said close-assist member is dangling.

11. An auto original feeder according to claim 8 or 9, wherein said close-assist member is provided on a side of said original feeding means.

12. An auto original feeder according to claim 8 or 9, wherein said close-assist member has a protrusion piece which protrudes toward said original feeding means and which abuts against said image reading means when said original feeding means is closed.

13. An auto original feeder according to claim 8 or 9, further comprising urging means for urging said close-assist member toward said image reading means.

14. An auto original feeder according to claim 8 or 9, wherein a handle member, which is adapted to be grasped by an operator, protrudes from said close-assist member.

15. An image forming apparatus comprising:

image forming means for forming on a sheet an image of an original read by image reading means;

an auto original feeder as recited in claim 8 or 9; and a close-assist member is provided on said auto original feeder.

* * * * *

UNITED STATES PATENT AND TRADEMARK OFFICE
CERTIFICATE OF CORRECTION

PATENT NO. : 6,690,910 B2
DATED : February 10, 2004
INVENTOR(S) : Hitoshi Fujimoto It is certified that error appears in the above-identified patent and that said Letters Patent is hereby corrected as shown below:

<u>Title page,</u>
Item [56], References Cited, FOREIGN PATENT DOCUMENTS,
"61118739   6/1986" should read -- 61-118739   6/1986 --; and
"08334941   12/1996" should read -- 08-334941   12/1996 --.

<u>Column 2,</u>
Line 14, "according" should read -- according to --.

Signed and Sealed this

Fifteenth Day of June, 2004

JON W. DUDAS
*Acting Director of the United States Patent and Trademark Office*